US007232785B2

(12) United States Patent
Spaether et al.

(10) Patent No.: US 7,232,785 B2
(45) Date of Patent: Jun. 19, 2007

(54) SOLID CATALYTIC COMPONENT AND CATALYTIC SYSTEM OF THE ZIEGLER-NATTA TYPE, PROCESS FOR THEIR PREPARATION AND THEIR USE IN THE POLYMERIZATION OF ALK-1-ENES

(75) Inventors: Wolf Spaether, Wachenheim (DE); John Lynch, Monsheim (DE); Joachim Rösch, Ludwigshafen (DE); Rainer Hemmerich, Tarragona (ES)

(73) Assignee: ABB Lummus Global, Inc., Bloomfield, NJ (US)

( * ) Notice: Subject to any disclaimer, the term of this patent is extended or adjusted under 35 U.S.C. 154(b) by 0 days.

(21) Appl. No.: 10/504,702

(22) PCT Filed: Jan. 28, 2003

(86) PCT No.: PCT/NL03/00058
§ 371 (c)(1),
(2), (4) Date: May 11, 2005

(87) PCT Pub. No.: WO03/068830

PCT Pub. Date: Aug. 21, 2003

(65) Prior Publication Data
US 2005/0202959 A1 Sep. 15, 2005

(30) Foreign Application Priority Data
Feb. 14, 2002 (EP) .................. 02075579

(51) Int. Cl.
*B01J 37/00* (2006.01)
*B01J 31/12* (2006.01)

(52) U.S. Cl. ............ 502/103; 502/103; 502/118; 502/123; 502/125; 502/126; 502/127; 502/104; 526/124.3; 526/129; 526/348; 526/348.1

(58) Field of Classification Search .......... 502/103, 502/118, 125, 126, 127, 104, 123; 526/124.3, 526/129, 348, 348.1
See application file for complete search history.

(56) References Cited

U.S. PATENT DOCUMENTS

| 4,263,168 A | | 4/1981 | Rochefort et al. |
| 4,311,817 A | * | 1/1982 | Morita et al. ............ 526/124.2 |
| 4,315,874 A | * | 2/1982 | Ushida et al. ................. 264/5 |
| 4,316,966 A | * | 2/1982 | Mineshima et al. .......... 525/53 |
| 4,329,252 A | | 5/1982 | Gavens et al. |
| 4,481,301 A | | 11/1984 | Nowlin et al. |
| 4,605,638 A | | 8/1986 | Nowlin et al. |
| 4,742,139 A | * | 5/1988 | Kioka et al. ............. 526/124.8 |
| 4,983,694 A | | 1/1991 | Furtek |
| 5,025,072 A | | 6/1991 | Nowlin et al. |
| 5,064,796 A | * | 11/1991 | Speca ........................ 502/107 |
| 5,330,949 A | * | 7/1994 | Funabashi et al. .......... 502/111 |
| 5,336,652 A | | 8/1994 | Mink et al. |
| 5,514,634 A | | 5/1996 | Hagerty et al. |
| 5,529,965 A | * | 6/1996 | Chang ........................ 502/110 |
| 5,939,348 A | | 8/1999 | Mink et al. |
| 5,994,256 A | | 11/1999 | Lottes et al. |
| 6,200,922 B1 | | 3/2001 | Hüffer et al. |
| 6,218,331 B1 | * | 4/2001 | DiMaio et al. ............. 502/109 |
| 6,221,984 B1 | * | 4/2001 | Kersting et al. ......... 526/124.3 |
| 6,291,384 B1 | | 9/2001 | Mink et al. |
| 6,825,293 B1 | * | 11/2004 | Goyal et al. ............. 526/124.1 |
| 6,831,032 B2 | * | 12/2004 | Spaether ..................... 502/103 |
| 2005/0085598 A1 | * | 4/2005 | Sandell et al. ................. 526/64 |

FOREIGN PATENT DOCUMENTS

| EP | 480 017 | 4/1991 |
| EP | 761 696 | 8/1996 |

* cited by examiner

*Primary Examiner*—David M. Brunsman
(74) *Attorney, Agent, or Firm*—Dilworth & Barrese, LLP

(57) ABSTRACT

The present invention relates to a new solid catalytic component, which can be used in combination with an aluminum compound as co-catalyst and optionally an external electron donor as additional co-catalyst to form a catalytic system of the Ziegler-Natta-catalyst-type. The solid catalytic system comprises titanium or vanadium compound, a compound of magnesium containing at least one halogen, a particulate porous support, and optionally an internal electron donor.

51 Claims, No Drawings

SOLID CATALYTIC COMPONENT AND CATALYTIC SYSTEM OF THE ZIEGLER-NATTA TYPE, PROCESS FOR THEIR PREPARATION AND THEIR USE IN THE POLYMERIZATION OF ALK-1-ENES

This application is a 371 filing of PCT/NL03/00058, filed 28 Jan. 2003.

The present invention relates to a new solid catalytic component which can be used in combination with an aluminium compound as co-catalyst and optionally an external electron donor as additional co-catalyst to form a catalytic system of the Ziegler-Natta-catalyst-type, which solid catalytic system comprises a titanium or vanadium compound, a compound of magnesium containing at least one halogen, a particulate porous support, and optionally an internal electron donor. The invention further relates to a process for preparing the new solid catalytic component, catalytic systems containing the solid catalytic component, and the use of the solid catalytic component in the polymerisation of alk-1-enes. The invention also relates to a process for preparing polymers of alk-1-enes, in particular homopolymers and copolymers of propylene using said catalytic system, the so obtained homopolymers and copolymers of propylene, their use in making films, fibres or mouldings, and said films, fibres and mouldings.

EP 480017 discloses a supported catalyst component comprising a magnesium halogenide and as support a particulate solid which solid is identified as Grace Silica SG332 and according to the specification has an irregular granular structure and a specific surface area of 200 to 400 μm. By using such a catalyst component it is possible to produce alk-1-enes polymers having a good morphology and bulk density with a good catalytic efficiency.

EP-A 761696 relates to catalytic systems of the Ziegler-Natta-type comprising as support particulate macroporous silicagels having a mean particle diameter of from 5 to 200 μm which are formed from smaller sub-particles by spray-drying. The catalytic systems show a good productivity and stereospecifity in the polymerisation of $C_2$–$C_{10}$ alk-1-enes.

However, on examination of the elemental distribution of the active constituents, in particular of the magnesium halogenide, the catalytic systems of both above mentioned patent specifications exhibit both a gradient from the outside of the support material into the inside of the porous oxide, resulting in a relative high initial activity which however during the further course of the polymerisation (at the catalyst residence times commonly used in industry) sharply decreases.

It is therefore an object of the present invention to overcome the above described disadvantages and to develope improved catalytic systems of the Ziegler-Natta-type, which have a clearly improved distribution of the active constituents inside the porous inorganic oxide (catalyst support) resulting in a clearly improved productivity combined with a smaller decrease in maximal initial activity and allowing the production of polymers of alk-1-enes having a good morphology and bulk density.

According to the invention this object is achieved by providing a solid catalytic component which can be used in combination with an aluminium compound as co-catalyst and optionally an external electron donor as additional co-catalyst (so called stereomodifier) to form a catalytic system of the Ziegler-Natta-type, which solid catalytic component comprises a titanium or vanadium compound, a compound of magnesium containing at least one halogen, a particulate porous support, and optionally an internal electron donor, wherein the solid catalytic component is prepared by using a process comprising a step of contacting the particulate porous support with a solution of a hydrocarbon soluble organomagnesium compound in a hydrocarbon solvent, which hydrocarbon solution of an organomagnesium compound is contacted with a coordinating electron donor compound in a molar ratio of coordinating electron donor compound to organomagnesium compound ranging from 0.25:1 to 5:1, the process of preparing the solid catalytic component further comprising a step of converting the organomagnesium compound into a compound of magnesium containing at least one halogen.

Particulate Solid Support

According to the invention in the preparation of the catalytic system a particulate porous support is used. The support may be any type of support commonly used in Ziegler-Natta type catalysts which is compatible with the polymerisation of alk-1-enes. The support should have the ability to chemically, physically or mechanically bind the magnesium compound containing at least one halogen.

A commonly used type of support of Ziegler-Natta catalysts are particulate inorganic oxides having a specific surface area in the range from 10 to 1000 $m^2$/g, preferably of from 50 to 700 $m^2$/g, and more preferably from 100 to 600 $m^2$/g, wherein the specific surface area is determined in accordance with DIN 66131, and a mean particle diameter in the range of from 5 to 200 μm, preferably from 10 to 100 μm, and more preferably from 15 to 60 μm. Mean particle diameter herein refers to the volume average mean (median value) of the particle size distribution as determined by Malvern Mastersizer Analysis (Fraunhofer laser light scattering) in accordance with ASTM Standard D 4464-00.

The particulate inorganic oxides used in the preparation of the solid catalytic component of the catalytic sytems of the invention may be of a granular (irregular) or spray-dried (semi-spherical, micro-spheroidal) nature, the use of so-called fumed silica, which in a subsequent wet-chemical treatment are build up to larger aggregrates being also included as well as any other particulate oxide derived from particle forming processes known in the literature.

As inorganic oxides mainly oxides of silicon, aluminium, titanium, zirconium, or of a metal from the main groups I or II of the Periodic Table, or mixtures of these oxides are contemplated. Examples of preferred oxides include aluminium oxide, aluminium phosphate, magnesium oxide or layered silicates. Particularly preferred is the use of silicon oxide (silicagel). Also mixed oxides, such as aluminium silicates, or magnesium silicates, may be used.

The particulate inorganic oxides used as support in the catalytic component of the invention in general have pore volumes of from 0.1 to 10 $cm^3$/g, preferably from 1.0 to 4.0 $cm^3$/g, said values being determined by mercury porosimetry in accordance with DIN 66133 and nitrogen adsorption in accordance with DIN 66131.

The pH value, i.e. the negative logarithm of the protonic concentration, of the particulate inorganic oxides used in the preparation of the solid catalytic component of the catalytic systems of the invention may vary depending on the production process used. Preferably, it is in the range of from 3.0 to 9.0, and more preferably from 5.0 to 7.0. The pH value is determined by using the method described in S. R. Morrison, *The Chemical Physics of Surfaces*, Plenum Press, New York [1977}, pages 130 ff.

After their production the inorganic oxides often contain hydroxyl groups on their surfaces. By cleavage of water or condensation of Si—OH groups respectively, the hydroxyl group content may be reduced or allmost completely removed. This can be carried out by means of a thermal or chemical treatment. In general, a thermal treatment comprises heating the oxide at temperatures of from 250 to 900° C., preferably from 600 to 800° C., for a period of from 1 to 24 hours, preferably from 2 to 20 hours, and more preferably from 3 to 12 hours. Removal of the hydroxyl groups by chemical means may be carried out by treating the oxide with usual drying agents such as, for example $SiCl_4$, chlorosilanes and aluminium alkyls. Preferably, the inorganic oxides used contain normally from 0.1 to 5% by weight physically adsorbed water in addition to the water bonded in hydroxylic form. Usually the water content is determined by drying the inorganic oxide until constant weight at 160° C. and normal pressure. The loss of weight correponds with the initial physically adsorbed water content.

The Compound of Titanium or Vanadium

The solid catalytic component further comprises a compound of titanium or vanadium.

As titanium compound in general the halogenides of tri- or tetravalent titanium are used. As titanium compound titanium alkoxy halogenide compounds and mixtures of two or more titanium compounds are also contemplated. Examples of suitable titanium compounds include $TiBr_3$, $TiBr_4$, $TiCl_3$, $TiCl_4$, $Ti(OCH_3)Cl_3$, $Ti(OC_2H_5)Cl_3$, $Ti(O\text{-}iso\text{-}C_3H_7)Cl_3$, $Ti(O\text{-}n\text{-}C_4H_9)Cl_3$, $Ti(OC_2H_5)Br_3$, $Ti(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$, or $Ti(O\text{-}n\text{-}C_4H_9)_4$. Preferably, titanium compounds wherein the halogen is chlorine, are used. Also preferred are those titanium halogenides that in addition to the titanium contain only halogen, and of these the titanium chlorides, and in particular titanium tetrachloride, are preferred.

Among the vanadium compounds that may be used in the preparation of the solid catalytic component of the catalytic system of the invention in particular the vanadium halogenides, the vanadium oxyhalogenides, the vanadium alkoxides and vanadium acetylacetonate can be mentioned. Preferred vanadium compounds are those having oxidation stages 3 to 5.

The Organomagnesium Compound

In the preparation of the solid catalytic component the particulate porous catalyst support is impregnated with at least one hydrocarbon soluble organomagnesium compound. Herein the term hydrocarbon soluble means that the organomagnesium compound dissolves (providing trace amounts of a solubilizing agent like aluminiumalkyls are present) in an amount of at least 5% by weight at ambient temperature in an aliphatic or aromatic hydrocarbon solvent essentially comprising no co-solvents such as ethers.

During the further course of the preparation of the solid catalytic compound said organomagnesium compound is converted into a compound of magnesium containing at least one halogen, by using known means, e.g. by contacting with a halogenating agent. Herein the term halogen refers to chlorine, bromine, jodine or fluorine or mixtures of two or more halogens. Preferably the compound of magnesium containing at least one halogen contains chlorine or bromine, and in particular chlorine.

Examples of suitable organomagnesium compounds include dialkyl, diaryl and alkylarylmagnesium compounds, magnesiumalkoxy or magnesiumaryloxy compounds or Grignard compounds.

Examples of suitable halogen free magnesium compounds include di-n-propylmagnesium, diisopropyl-magnesium, di-n-butylmagnesium, di-sec.-butylmagnesium, di-tert.-butylmagnesium, diamylmagnesium, n-butylethylmagnesium, n-butyl-sec.-butylmagnesium, n-butyloctylmagnesium, diphenylmagnesium, diethoxymagnesium, di-n-propyloxymagnesium, di-iso-propyloxymagnesium, di-n-butyloxymagnesium, di-sec.-butyloxymagnesium, di-tert.-butyloxymagnesium, diamyloxymagnesium, n-butyloxyethoxymagnesium, n-butyloxy-sec.-butyloxymagnesium, n-butyloxyoctyloxymagnesium or diphenoxymagnesium. Among these, n-butylethylmagnesium and n-butyloctylmagnesium are preferred.

Examples of halogen containing Grignard compounds include n-butylmagnesium chloride, butylmagnesium bromide, sec.-butylmagnesium chloride, sec.-butylmag-nesium bromide, tert.-butylmagnesium chloride, tert.-butylmagnesium bromide, amylmagnesium chloride, isoamylmagnesium chloride, hexylmagnesium chloride, octylmagnesium chloride, phenylmagnesium chloride, and phenylmagnesium bromide.

Particularly preferred magnesium compounds in the preparation of the solid catalytic component are magnesium di($C_2$–$C_{10}$ alkyl) compounds.

In the preparation of the solid catalytic component of the invention in general from 0.1 to 10 moles, preferably from 0.1 to 2.0 moles and more preferably from 0.3 to 1.5 mole of the organomagnesium compound is used for each mole of the particulate inorganic oxide. The use of a large excess of organomagnesium compound may cause in side precipitations which are not deposited on the support and lead to an unfavourable morphology. Contacting the particulate porous support with a large amount of organomagnesium compound and filtering of the excess might result in an undesired low degree of deposition onto the support.

The Coordinating Electron Donor Compound

The hydrocarbon soluble organomagnesium compounds used in the preparation of the solid catalytic component of the invention are contacted with at least one coordinating electron donor compound which does not result in the release of the corresponding $C_2$–$C_{10}$ alkanes but merely offers electron pairs in coordinating bond type, before or during the step of impregnating the particulate inorganic oxide. The molar ratio of coordinating electron donor compound to organomagnesium compound preferably ranges from 0.1 to 5.0, and more preferably from 1.0 to 2.0.

Examples of the coordinating electron donor compound include dialkyl ethers, diaryl ethers, cyclic ethers, furanes, tetrahydrofuran, tertiary alkylamines, siloxanes. Among these coordinating donors the alkyl ethers and cyclic alkylethers, such as dimethyl ether, diethyl ether, di-n-propyl ether, di-isoproppyl ether, di-n-butyl ether, di-isobutyl ether as well as tetrahydrofuran are in particular preferred. It should be understood that the listed compounds are only mentioned by way of illustrative examples and not to limit the scope of the invention.

The Halogenating Agent

Suitable halogenating agents include halogens, hydrogen halogenides, $SiCl_4$ or $CCl_4$ and preferably chlorine or hydrogen chloride.

The Internal Electron Donor Compound

In addition to the coordinating electron donor compound which is contacted with the organomagnesium compound during the step of impregnating the support with the organomagnesium compound one or more so-called internal electron donor compounds may be used in the preparation of the solid catalytic component. Examples of suitable internal electron donor compounds include mono or polyfunctional carboxylic acids, carboxylic anhydrides, or carboxylic esters, and also ketones, ethers, alcohols, lactones or organophosphorus or organosilicon compounds.

Preferred internal donor compounds included carboxylic acid derivatives and in particular phtalic acid derivatives having the general formula (I)

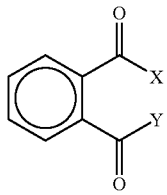

wherein X and Y each represent a chorine or bromine atom or a $C_1$–$C_{10}$ alkoxygroup or X and Y taken together represent an oxygen atom forming an anhydride function. Particularly preferred internal electron donor compounds are phtalic esters of formula (I) wherein X and Y each are a $C_1$–$C_8$ alkoxy group, such as a methoxy, ethoxy, n-propyloxy, isopropyloxy, n-butyloxy, sec.-butyloxy, or tert.-butyloxy group. Examples of preferred phtalic esters include diethyl phtalate, di-n-butyl phtalate, di-isobutyl phtalate, di-n-pentyl phtalate, di-n-hexyl phtalate, di-n-heptyl phtalate, di-n-octyl phtalate or di-2-ethylhexyl phtalate.

Further examples of preferred internal electron donor compounds include diesters of 3- or 4-membered, optionally substituted cycloalkane 1,2-dicarboxylic acids, as well as monoesters of substituted benzophenone 2-carboxylic acids or substituted benzophenone 3-carboxylic acids. As hydroxy compounds in the esterfication reaction for synthesis of these esters usual alkanols such as $C_1$–$C_{15}$ or $C_5$–$C_7$ cycloalkanols, which alkanols optionally may be substituted with one or more $C_1$–$C_8$ alkyl groups, as well as $C_1$–$C_{10}$ phenols, are used.

A further group of suitable internal donor compounds are the non-substituted and substituted ($C_1$–$C_{10}$ alkyl)-1,3-propane diethers and derivatives of the group of succinates.

Also mixtures of two or more internal electron donor compounds may be used in the preparation of the solid catalytic component of the invention.

When used in the preparation of the particulate solid component, the internal electron donor compound in general is used in an amount of from 0.05 to 2.0 moles, preferably 0.2 to 0.5 mole for each mole of the organomagnesium compound.

In general in the preparation of the solid catalytic component further a $C_1$–$C_8$ alkanol, such as methanol, ethanol, n-propanol, isopropylalcohol, n-butanol, sec.-butanol, tert.-butanol, isobutylalcohol, n-hexanol, n-heptanol, n-octanol or 2-ethylhexanol, or mixtures of two or more of these alkanols, preferably ethanol, e.g. in amounts of 1 to 5 moles, preferably 1,6 to 4 moles and more preferaly 1,5 to 3.5 moles for each mole of the organomagnesium compound is used.

The Preparation of the Solid Catalytic Component

The solid catalytic component of the invention preferably is produced by using the following two-stage process:

In the first stage the particulate porous support, e.g. an inorganic oxide is suspended in an inert solvent, preferably a liquid alkane or aromatic hydrocarbon solvent, e.g. toluene or ethylbenzene, and the slurry formed is treated with a solution of the hydrocarbon soluble organomagnesium compound (in a hydrocarbon solvent such as heptane), which solution either before or during this reaction step is contacted with 0.25 to 5.0, preferably 1 to 2 molar equivalents of the coordinating electron donor compound, and then the mixture formed is reacted at a temperature of from 10 to 120° C. for from 0.5 to 5 hours, normally under stirring. Next a halogenating agent, such as chlorine or hydrogen chloride is added in at least a two-fold molar excess, preferably at least a five-fold molar excess, based on the organomagnesium compound, in general under stirring, and allowed to be reacted for about 30 to about 120 minutes, and optionally 1 to 5 moles, preferably 1.6 to 4 moles, more preferably 1.5 to 3.5 moles of the $C_1$–$C_8$ alkanol are added for each mote magnesium at a temperature between –20 and 150° C. and preferably reacted for a period of 30 minutes. Next the liquid phase is removed by filtration and the separated solid product is washed with a liquid hydrocarbon. Then the resulting solid product is resuspended in an inert hydrocarbon, preferably a $C_1$–$C_{10}$ alkylbenzene. Alternatively, the removal of the liquid slurry phase is carried out before the halogenating step or before the addition of the $C_1$–$C_8$ alkanol. Next a compound of titanium or vanadium, preferably a titanium compound, and optionally the internal electron donor compound are added, in an amount of 1 to 15 moles, preferably 2 to 10 moles of the titanium compound, and 0.01 to 1 mole, preferably 0.2 to 0.5 mole of the internal electron donor compound for each mole of the organomagnesium compound. The resulting mixture is allowed to react, in general under stirring, for at least 30 minutes at a temperature in the range of from 10 to 150° C., preferably from 60 to 130° C. The so obtained solid product is then collected by filtration and washed with a $C_1$–$C_{10}$ alkylbenzene, preferably ethylbenzene.

In the second stage the solid product resulting from the first stage is extracted with an excess of titanium tetrachloride or an excess of a solution of titanium tetrachloride in an inert solvent, preferably a $C_1$–$C_{10}$ alkylbenzene, containing at least 5% by weight of titanium tetrachloride. In general the extraction is continued for at least 30 minutes. Then the product is washed with a liquid alkane until the content of titanium tetrachloride in the washing liquid is less than 2% by weight.

The solid catalytic component preferably has a molar ratio of the inorganic oxide to the compound of titanium or vanadium in the range of from 1000 to 1, more preferably from 100 to 2, and in particular from 50 to 3.

An advantage of the solid catalytic component the invention is that the active constituents comprising compounds of magnesium containing at least a halogen, preferably chlorine or bromine, and more preferably chlorine, a compound of titanium or vanadium and optionally an internal electron donor compound, are more homogenously distributed over the inside of the porous inorganic oxide. Said more homogenous distribution of the active constituents, in particular of the magnesium compound containing at least one halogen may be demonstrated for example by means of EDX spectroscopy by energy disperse element mapping on a granule cross section of the final solid catalytic component. To this end the solid catalytic component is embedded in a embedding agent which is chemically inert with respect to the catalyst and which is preferably an epoxy resin, under an inert atmosphere and cut and/or grinded and optionally finished with a polishing agent to prepare a sample. The elemental distributions of preferably Si, Ti, Mg and Cl, on said cross section are determined with a high resolution (at least 1 $\mu m^2$) on a plurality of granules of the solid catalytic component.

The ratios of the element specific counts over the cross section of said samples may be determined by using the so-called line scanning by means of an energy disperse EDX probe. So, the radial distributions of the counts of the elements inside the porous catalyst support which are considered as active constituents are obtained.

By using the described immobilising reaction for impregnating an inorganic porous support comprising contacting said support with a solution of a hydrocarbon soluble organomagnesium compound in a hydrocarbon solvent which previously or concurrently with the impregnation is contacted with a coordinating electron donor compound, in addition to a more uniform distribution also an increase of the immobilising capacity of the active constituents i.e. the compound of magnesium containing at least one halogen, the titanium or vanadium compound, and the internal electron donor compound is obtained.

The improved impregnating effect may be quantified by means of the so-called line scan on the granule cross sections described above by comparing the element specific counts at the outside and the inside of the solid catalytic component. Said ratio depends, if the other reaction parameters are kept constant, strongly on the nature of the solid oxide used; in any case, the described pre-treatment of the organomagnesium compound with the coordinating electron donor compound results in an improved performance of the catalytic systems comprising the solid catalytic component.

Indeed catalytic systems comprising the solid catalytic component of the invention demonstrate a considerably increased productivity when compared with catalytic systems produced by using prior art methods (vide the comparative examples hereinafter).

The effect on the productivity can be assessed both in continuous processes of gas phase, bulk or suspension polymerisation and in discontinous batch polymerisations (gasphase, bulk, suspension) in pressure autoclaves as well as in suspension polymerisation at normal pressure.

The Aluminium Compound Co-catalyst

The catalytic systems of the invention in addition to the solid catalytic component further comprise an aluminium compound as co-catalyst.

Examples of suitable aluminium compounds include aluminium trialkyls and derivatives thereof wherein an alkyl group is substituted by an alkoxy group or a halogen atom, e.g. chlorine or bromine atom. The alkyl groups may be the same or different. The alkyl groups may be linear or branched chain alkyl groups. Preferred trialkylaluminium compounds are those wherein the alkyl groups each have 1 to 8 C-atoms, such as trimethylaluminium, triethylaluminium, tri-isobutylaluminium, trioctylaluminium or methyldiethylaluminium.

The External Electron Donor Compound

In addition to the aluminium compound the catalytic system of the invention preferably comprises as further co-catalyst an external electron donor compound. Examples of external electron donor compounds which may be used in the catalytic system of the invention include mono- and polyfunctional carboxylic acids, carboxylic anhydrides and carboxylic esters, and ketones, ethers, alcohols, lactones as well as organic phosphorus and silicon compounds. Also a mixture of two or more external electron donor compounds may be used. The external electron donor compound and the internal electron donor compound used in the preparation of the solid catalyst component a) may be the same or different. Preferred external electron donor compounds are the organosilicon compounds of general formula (II)

$$R^1_n Si(OR^2)_{4-n} \qquad (II)$$

wherein each of the $R^1$'s, which may be the same or different, represents a $C_1$–$C_{20}$ alkyl group, a 5- to 7-membered cyclic alkyl group optionally substituted with $C_1$–$C_{10}$alkyl, a $C_6$–$C_{18}$ aryl group or a $C_6$–$C_{18}$ aryl-$C_1$–$C_{10}$alkyl group, an $R^2$ may be the same or different and is a $C_1$–$C_{20}$ alkyl group and n is the integer 1, 2 or 3.

Preferred compounds of formula (II) are diisopropyldimethoxysilane, isobutyliso-propyldimethoxysilane, diisobutyldimethoxysilane, dicyclopentyldimethoxysilane, cyclohexylmethyldimethoxysilane, dicyclohexyldimethoxysilane, isopropyl-tert.-butylidimethoxysilane, isopropyl-sec.-butylidimethoxysilane, and isobutyl-sec.-butylidimethoxysilane.

Preparation of the Catalytic System

To prepare the catalytic system of the invention the aluminium compound as co-catalyst and the external electron donor compound as additional co-catalyst may be contacted with the solid catalytic component separately in any order or mixed together, normally at a temperature in the range of from 0 to 200° C., preferably from 20 to 90° C. and a pressure of from 1 to 100 bar, in particular from 1 to 40 bar.

Preferably the aluminium compound co-catalyst is added in such an amount that the atomic ratio of the aluminium compound to the transition metal of the solid catalytic component is from 10:1 to 800:1, in particular from 20:1 to 200:1.

The catalytic systems of the invention may be advantageously used in the polymerisation of alk-1-enes. Suitable alk-1-enes include linear or branches $C_2$–$C_{10}$ alkenes, in particular linear $C_2$–$C_{10}$ alk-1-enes such as ethylene, propylene, but-1ene, pent-1-ene, hex-1-ene, hept-1-ene, oct-1-ene non-1-ene, dec-1-ene or 4-methylpent-1-ene. Mixtures of these alk-1-enes may be polymerised as well.

The catalytic systems of the invention comprising the solid catalytic components and as co-catalyst an aluminium compound or an aluminium compound and an external electron donor compound are excellent catalytic systems for use in the production of propylene polymers, both homopolymers of propylene as well as copolymers of propylene and one or more further alk-1-enes having up to 10 C-atoms. The term copolymers as used herein also refers to copolymers wherein the further alk-1-ene having up to 10 C-atoms is incorporated randomly. In these copolymers in general the comonomer content is less than 15% by weight. The copolymers may also be in the form of so-called block or impact copolymers, which in general comprise at least a matrix of a propylene homopolymer or propylene random copolymer containing less than 15% by weight of a further alk-1-ene having up to 10 C-atoms and a soft phase of a propylene copolymer containing 15 to 80% by weight of further alk-1-enes having up to 10 C-atoms. Also mixtures of comonomers are contemplated, resulting in e.g. terpolymers of propylene.

Polymerisation

The production of the propylene polymers may be carried out in any common reactor suitable for the polymerisation of alk-1-enes, either batchwise or, preferably, continously, i.a. in solution (bulk phase), as suspension polymerisation or as gasphase polymerisation. Examples of suitable reactors include continuously operated stirred reactors, loop reactors, fluid bed reactors, or horizontal or vertical stirred powder bed reactors. It will be understood that the polymerisation may be carried out in a series of consecutively coupled reactors. The reaction time depends on the chosen reaction conditions. In general the reaction time is from 0.2 to 20 hours, usually from 0.5 to 10 hours.

In general the polymerisation is carried out at a temperature in the range of from 20 to 150° C., preferably from 50 to 120° C., and more preferably from 60 to 90° C., and a pressure in the range of from 1 to 100 bar, preferably from 15 to 40 bar, and more preferably from 20 to 35 bar.

The molecular weight of the so produced polymers may be controlled and adjusted over a wide range by adding polymer chain transfer or -termination inducing agents as commonly used in the art of polymerisation, such as e.g. hydrogen. In addition an inert solvent, such as toluene or hexane, or an inert gas, such as nitrogen or argon, and smaller amounts of a powdered polymer, e.g. polypropylene powder may be added.

The (weight) average molecular weights of the propylene polymers produced by using the catalytic system of the invention in general are in the range of from 10.000 to 1.000.000 g/mole and the melt flow rates are in the range of from 0.1 to 100 g/10 min, preferably from 0.5 to 50 g/10 min. The melt flow rate corresponds to the amount which is pressed within 10 minutes from a test instrument in accordance with ISO 1133 at a temperature of 230° C. and under a load of 2.16 kg. Certain applications might require different molecular weights than mentioned above and are contemplated to be included.

The catalytic systems of the invention enable to polymerise alk-1-enes producing polymers having a good morphology and a high bulk density when compared with the prior art catalytic systems. In addition the catalytic systems of the invention have an increased productivity.

Due to their good mechanical properties the polymers obtainable by using the a catalytic system comprising the solid catalytic component solids of the invention, and in particular the propylene homopolymers or the copolymers of propylene with one or more further alk-1-enes having up to 10 C-atoms can be used advantageously for the production of films, fibres or mouldings and in particular for the production of films.

EXAMPLES

The solid catalytic components, catalytic systems and polymers obtained in the examples below were characterised by carrying out the following tests.

Measurement of the Mean Particle Diameter D:

To determine the mean particle diameter D of the particulate inorganic oxide the particle size distribution of the particles of the oxide was measured by laser light scattering (Malvern) analysis in accordance with ASTM Standard D 4464-00 and from the result the volume average (median value) particle diameter was calculated.

Measurement of the Specific Surface Area

The specific surface area was measured by nitrogen adsorption in accordance with DIN 66131.

Measurement of the Pore Volume

The pore volume was measured by mercury porosimetry in accordance with DIN66133.

Measurement of the pH Value

The pH value of the silicagel was measured by using the method described in S. R. Morrison, *The Chemical Physics of Surfaces*, Plenum Press, New York [1977}, pages 130 ff.

Measurement of the Water Content

To determine the physically adsorbed water content 5 g silicagel was dried at 160° C. and normal pressure (constant weight). The loss of weight correspond to the initial physically bonded water content.

Measurement of the Productivity

The productivity is defined as the amount of polymer in grams obtained per gram solid catalytic component used.

Measurement of Melt Flow Rate (MFR)

The MFR was measured in accordance with ISO-Norm 1133, at 230° C. and a load of 2.16 kg.

Measurement of the Isotacticity Index

The isotacticity index was measured in accordance with ISO Norm 1873-1: 1999.

Preparation of the Solid Catalytic Component

Example 1a

An irregular granular silicagel ($SiO_2$) having a mean particle diameter D of 43 µm was used as the particulate porous support. The silicagel was further characterized by a specific surface area of 310 $m^2/g$, a pore volume of 1,6 $cm^3/g$, a pH-value of 5.5, and a water content of 2.1% by weight.

The silicagel was treated with a solution of n-butyloctyl-magnesium in a mixture of n-heptane and ethylbenzene (heptane content 33%), using for each mole of $SiO_2$ 0.4 mole of the magnesium compound which had been contacted previously with 2 molar equivalents, based on the magnesium compound, of diethylether for 5 minutes. The solution was stirred at a temperature of 95° C. for 30 minutes and then cooled to 20° C., and then a 10-fold excess, based on the organomagnesium compound, of hydrogen chloride was introduced. After 60 minutes the reaction product was treated with 2.5 mole ethanol per mole organomagnesium compound and was stirred at 80° C. for 30 minutes and subsequently the solid product was separated from the suspension medium by filtration and washed with a portion of ethylbenzene (50 ml). The solid reaction product was resuspended in ethylbenzene (200 ml) and then treated with 6.0 mole titanium tetrachloride and 0.45 mole di-n-butyl phtalate per mole organomagnesium compound used. Then stirring was continued for 1 hour at 100° C. and the solids formed were filtered of and a number of times washed with ethylbenzene.

The obtained solid product was extracted with a 10% (vol) solution of titanium tetrachloride in ethylbenzene. Then the solid product was separated from the extraction agent and washed with n-heptane until the washings contained only 0.3% by weight of titanium tetrachloride.

The so produced solid catalytic component 1a contained
3.2% by weight Ti
8.2% by weight Mg
33.6% by weight Cl.

Comparative Example 1b

In this comparative example the procedure of example 1a was repeated except that the organomagnesium compound which was reacted with the silicagel, was neither before nor during the reaction contacted with a coordinating electron donor compound—diethylether in example 1a.

The so produced solid catalytic component 1b contained
3.3% by weight Ti
7.5% by weight Mg
28.7% by weight Cl.

Example 2a

The procedure of example 1a was repeated, except that a microspheroidal spray-dried silicagel having a mean diameter of the spray-dried particles of 58 μm, a BET surface area of 500 m$^2$/g, and a pore volume of 1.65 ml/g was used instead of the irregular granular silicagel support of example 1a. The organomagnesium compound was used in an amount of 0.67 mole per mole SiO$_2$.

The so produced solid catalytic component 2a contained
3.9% by weight Ti
9.6% by weight Mg
37.2% by weight Cl.

Comparative Example 2b

The procedure of example 2a was repeated except that analogously to comparative example 1b—the organomagnesium compound was not contacted with a coordinating electron donor compound—diethylether in case of example 2a.

The so produced solid catalytic component 2b contained
4.1% by weight Ti
10.0% by weight Mg
36.7% by weight Cl.

Example 3a

The procedure of example 1a was repeated, except that a microspheroidal spray-dried silicagel having a mean diameter of the spray dried particles of 20 μm, a BET surface area of 490 m$^2$/g, and a pore volume of 1.65 ml/g was used instead of the irregular granular silicagel support of example 1a. The organomagnesium compound was used in an amount of 0.67 mole per mole SiO$_2$.

The so produced solid catalytic component 3a contained
3.6% by weight Ti
9.9% by weight Mg
37.0% by weight Cl.

Comparative Example 3b

The procedure of example 3a was repeated except that—analogously to comparative example 1b—the organomagnesium compound was not contacted with a coordinating electron donor compound—diethylether in case of example 3a.

The so produced solid catalytic component 3b contained
3.9% by weight Ti
9.9% by weight Mg
37.8% by weight Cl.

Polymerisations

The solid catalytic components of examples 1a–3a as well as those of comparative examples 1b–3b were examined under the same conditions in polymerisations carried out as described below:

100 g of polypropylene homopolymer were loaded in a gasphase autoclave and treated with 20 mmoles of triethylaluminium and 1 mmole of isobutylisopropyldimethoxysilane (each dissolved in 10 ml heptane) under stirring. Then, under a low propylene counter current, a heptane suspension of the solid catalytic component (10 ml of heptane, 75 mg of the solid catalytic component) was loaded in the autoclave which then was sealed of and filled with 10 normal liters of hydrogen gas. The propylene partial pressure was increased from normal conditions to 28 bar and the temperature inside the autoclave was increased from 35° C. to 70° C. within a period of 10 minutes. At this point of time the polymerisation was continued while the pressure and temperature were kept constant for a further 60 minutes and then the reaction was stopped by pressure release and cooling. The polypropylene homopolymer was recovered and the catalytic productivity (g polymer/g solid catalytic component) is determined gravimetrically. The melt flow rate and the isotacticity index, based on the xylene solubles, of the polymer in unaltered form are determined.

The activity vs time profile is determined in a suspension polymerisation (Exxsol) at a polypropylene partial pressure of 2 bar and a temperature of 50° C. without addition of hydrogen as molecular weight modifier. The instantaneous monomer consumption is measured by means of an appropriate mass flow rate regulator and plotted against the catalyst residence time. To determine the activity ratio the maximum activity (after about 10 minutes of polymerisation) compared with the reactivity after a catalyst residence time of 60 minutes.

The properties of the propylene homopolymers obtained by using the polymerisation procedure described above and using the solid catalytic components prepared in the examples 1a–3a and comparative examples 1b–3b are presented in the following table.

|  | Examples | | | Comparative Examples | | |
| --- | --- | --- | --- | --- | --- | --- |
|  | 1a | 2a | 3a | 1b | 2b | 3b |
| Mean particle diameter (D) SiO$_2$ [μm] | 43 | 58 | 20 | 43 | 58 | 20 |
| Ratio Mg/SiO$_2$ [mole/mole] (max.) | 0.4 | 0.67 | 0.67 | 0.4 | 0.67 | 0.67 |
| Spec. surface area (BET) [m$^2$/g] | 309 | 505 | 495 | 309 | 505 | 495 |
| Coord. electr. donor cmpd. ratio [mole/mole] | 2 | 2 | 2 | 0 | 0 | 0 |
| Average line scan counts Mg (outside/inside) | 1.0 | 1.1 | 1.3 | 2.0 | 1.8 | 2.0 |
| Ratio Max. activity/final activity | 1.0 | 1.2 | 1.1 | 1.2 | 1.6 | 1.4 |
| Productivity [g PP/g solid cat. component] | 20,100 | 33,000 | 35,500 | 15,8000 | 28,500 | 30,000 |
| MFR [g/10 min] | 7.2 | 11 | 11 | 8.2 | 10 | 10 |
| Xylene solubles [%] | 0.5 | 0.7 | 1.2 | 0.8 | 0.8 | 0.8 |
| Isotacticity index II | 99.5 | 99.3 | 98.9 | 99.2 | 99.2 | 99.2 |

Ziegler-Natta catalysts are the subject of continued improvements, because their properties such as activity/productivity, morphology, stereospecifity very strongly effect the polymerisation process. In addition a uniformly good catalytic behaviour during the whole residence time in the polymerisation reactor is desirable. In particular catalysts supported on silicagel should contain the active constituents homogenously distributed over the support matrix which is inert per se to avoid that a too high initial activity followed by a dramatic decrease of the activity. Said undesirable effects occur when the active components are localised preferably on the outside of the support matrix and are present in the inside of the support in only a very low concentration. During the course of the polymerisation fragmentation of the catalyst particles results in exposure of the inside and depending on the distribution of the active components new active sites may be rendered available for polymerisation. The treatment with coordinating electron donor compounds of the magnesium compounds which in the further course of the preparation are converted into magnesium halogenides results in an improved migration of the magnesium compound into the pore system of the porous inorganic oxides, because the degree of aggregation of the in general highly aggregated magnesium compounds is considerably lowered by the coordinating electron donor compounds.

A further advantage of the solid catalytic component of the invention is that its preparation does not require the use of donor solvents, which solvents otherwise should be removed carefully and with great effort to avoid that they affect the polymerisation performance of in particular stereoselective polyalk-1-ene polymerisation catalysts.

The invention claimed is:

1. A solid catalytic component comprising a titanium or vanadium compound, a compound of magnesium containing at least one halogen, a particulate porous support, and optionally an internal electron donor, wherein the solid catalytic component is prepared by using a process comprising a step of contacting the particulate porous support with a solution of an hydrocarbon soluble organomagnesium compound in a hydrocarbon solvent, which solution of a hydrocarbon soluble organomagnesium compound is contacted with a coordinating electron donor compound in a molar ratio of coordinating donor compound to organomagnesium compound ranging from 0.1:1 to 5:1, the process of preparing the solid catalytic component further comprising a step of converting the organomagnesium compound into a compound of magnesium containing at least one halogen.

2. A solid catalytic component according to claim 1, wherein said hydrocarbon soluble organomagnesium compound is a dialkyl, diaryl or alkylarylmagnesium compound.

3. A solid catalytic component according to claim 2, wherein the molar ratio of the organomagnesium compound to the particulate inorganic oxide ranges from 0.1:1 to 1.0:1.

4. A solid catalytic component according to claim 2, wherein said compound of titanium or vanadium is titanium tetrachloride.

5. A solid catalytic component according to claim 1, wherein said coordinating electron donor compound is a dialkyl ether, cyclic ether, alkylamine or siloxane.

6. A solid catalytic component according to claim 5, wherein the molar ratio of the organomagnesium compound to the particulate inorganic oxide ranges from 0.1:1 to 1.0:1.

7. A solid catalytic component according to claim 5, wherein said compound of titanium or vanadium is titanium tetrachloride.

8. A solid catalytic component according to claim 1, wherein said particulate porous support is a solid inorganic oxide.

9. A solid catalytic component according to claim 8, wherein the molar ratio of the organomagnesium compound to the particulate inorganic oxide ranges from 0.1:1 to 1.0:1.

10. A solid catalytic component according to claim 8, wherein said compound of titanium or vanadium is titanium tetrachloride.

11. A solid catalytic component according to claim 1, wherein said particulate porous support has a specific surface area in the range from 10 to 1000 $m^2/g$, and a mean particle diameter in the range of from 5 to 200 µm.

12. A solid catalytic component according to claim 11, wherein the molar ratio of the organomagnesium compound to the particulate inorganic oxide ranges from 0.1:1 to 1.0:1.

13. A solid catalytic component according to claim 11, wherein said compound of titanium or vanadium is titanium tetrachloride.

14. A solid catalytic component according to claim 1, wherein the molar ratio of the organomagnesium compound to the particulate inorganic oxide ranges from 0.1:1 to 1.0:1.

15. A solid catalytic component according to claim 14, wherein said compound of titanium or vanadium is titanium tetrachloride.

16. A solid catalytic component according to claim 1, wherein said compound of titanium or vanadium is titanium tetrachloride.

17. A solid catalytic component according to claim 1, wherein said coordinating electron donor compound is an alkyl ether or cyclic alkyl ether.

18. A solid catalytic component according to claim 1, wherein said particulate porous support is a solid inorganic oxide.

19. A solid catalytic component according to claim 1, wherein said particulate porous support is silicon oxide.

20. A solid catalytic component according to claim 1, wherein said particulate porous support has a specific surface area in the range of from 50 to 700 $m^2/g$, and a mean particle diameter in the range of from 10 to 100 µm.

21. A solid catalytic component according to claim 1, wherein said particulate porous support has a specific surface area in the range from 100 to 600 $m^2/g$, and a mean particle diameter in the range of from 15 to 60 µm.

22. A solid catalytic component according to claim 1, wherein magnesium content within each particle of the catalytic component varies by a ratio of from 1:1 to no more than 1.3:1.

23. The catalytic component according to claim 1 further comprising an aluminum compound co-catalyst.

24. Process for preparing a solid catalytic component comprising the steps of
  a) suspending a particulate porous support in a inert medium,
  b) contacting the slurry formed in step a) with a solution of a hydrocarbon soluble organomagnesium compound in a hydrocarbon solvent, which solution either has been contacted before this step or is contacted concurrently with this step with an coordinating electron donor in a molar ratio of coordinating electron donor compound to organomagnesium compound of from 0.1:1 to 5:1, to form a solid product,
  c) contacting the solid product of step b) with a halogenating agent,
  d) resuspending the halogenated solid product of step c) in an inert solvent, adding a compound of titanium or vanadium, and optionally an alkanol and optionally an internal electron donor compound,
e) allowing the mixture formed in step d) to react, and recovering the solid product formed,
f) extracting the solid product of step e) with an excess of titanium tetrachloride, optionally dissolved in an inert solvent and recovering the solid catalytic component.

25. The process of claim 24 further comprising the step of
g) contacting the solid catalytic component with either
   i) an aluminium compound or
   ii) an aluminium compound and an external electron donor compound, mixed together or in any order.

26. Process of claim 24 wherein the solution of hydrocarbon soluble organomagnesium compound is contacted with the coordinating electron donor prior to step (b).

27. Process of claim 24 wherein the particulate porous support has a specific surface area of from about 50 to about 700 m²/g, a mean particle diameter of from about 5 μm to about 200 μm, and is selected from the group consisting of silica, alumina, magnesium oxide, aluminum phosphate, aluminum silicate and magnesium silicate.

28. Process of claim 24 wherein the coordinating electron donor is selected from the group consisting of dialkyl ethers, diaryl ethers, cyclic ethers, furanes, tetrahydrofuran, tertiary alkylamines and siloxanes.

29. Process of claim 24 wherein the hydrocarbon soluble magnesium compound is selected from the group consistiun of di-n-propylmagnesium, diisopropyl-magnesium, di-n-butylmagnesium, di-sec.-butylmagnesium, di-tert,-butylmagnesium, diamylmagnesium, n-butylethylmagnesium, n-butyl-sec.-butylmagesium, -butyloctylmagnesium, diphenylmagnesium, diethoxymagnesium, di-n-propyloxymagnesium,4 di-iso-propyloxymagnesium, di-n-butyloxymagnesium, di-sec.-butyloxymagnesium, di-tert.-butyloxymagnesium, diamyloxymagnesium, n-butyloxyethoxymagnesium, butyloxy-sec.-butyloxymagnesium, n-butyloxyoctyloxymagnesium or diphenoxy-magnesium, n-butylmagnesium chloride, butylmagnesium bromide, sec.-butylmagnesium chloride. sec.-butylmagnesium bromide, tert.-butylmagnesium chloride, tert.-butylmagnesium bromide, amylmagnesium chloride, isoamylmagnesium chloride, hexylmagnesium chloride, octylmagnesium chloride, phenylmagnesium chloride and phenylmagnesium bromide.

30. Process of claim 24 wherein an alkanol selected from the group consisting of methanol, ethanol, n-propanol, isopropylalcohol, n-butanol, sec.-butanol, tert.-butanol, isobutylalcohol, n-hexanol, n-heptanol, n-octanol or 2-ethylhexanol and mixtures thereof is added in step (d).

31. Process of claim 24 wherein an internal electron donor selected from the group consisting of monofunctional carboxylic anhydrides, polyfunctional carboxylic acids, carboxylic anhydrides, carboxylic esters, ketones, ethers, alcohols, lactones, organophosphorus compounds and organosilicon compounds is added in step (c).

32. A catalytic system of the Ziegler-Natta type comprising a solid particulate catalytic component wherein magnesium content within each particle of the catalytic component varies by a ratio of from 1:1 to no more than 1.3:1.

33. The catalytic system of claim 32 further comprising an aluminium compound co-catalyst and optionally an external electron donor compound as additional co-catalyst.

34. The catalytic system of claim 33 wherein the external electron donor compound is selected from the group consisting of diisopropyldimethoxysilane, isobutylisopropyldimethoxysilane, diisobutyldimethoxysilane, dicyclopentyidimethoxysilane, cyclohexylmethyldimethoxysilane, dicyclohexyldimethoxysilane, isopropyl-tert.-butylidimethoxysilane, isopropyl-sec.-butylidimethoxysilane, and isobutyl-sec.-butylidimethoxysilane.

35. The catalytic system of claim 32 wherein the solid particulate catalytic component includes a titanium or vanadium compound.

36. The catalytic system of claim 32 wherein the solid particulate catalytic component includes titanium tetrachioride.

37. The catalytic system of claim 32 wherein the solid particulate catalytic component includes a magnesium compound containing a halogen.

38. The catalytic system of claim 32 wherein the solid particulate catalytic component includes a porous inorganic oxide.

39. The use-ef-a catalytic system according to claim 32 wherein the solid particulate catalytic component includes a porous particulate support comprising a solid inorganic oxide.

40. The catalytic system according to claim 39 wherein the porous particulate support has a specific surface area in the range from 10 to 1000 m²/g and a mean particle diameter in the range of from 5 to 200 μm.

41. A process for the polymerisation of alk-1-enes comprising:
a) providing a Ziegler-Natta catalyst including a solid particulate catalytic component wherein magnesium content within each particle of the catalytic component varies by a ratio of 1:1 to no more than 1.3:1, and
b) polymerizing at least one alk-1-ene in the presence of the Ziegler-Natta catalyst to provide a polymer.

42. The process of claim 41 wherein the Ziegler-Natta catalyst further includes an aluminum compound co-catalyst.

43. The process of claim 42, further including an alk-1-ene comonomer having up to 10 C-atoms.

44. The process of claim 41 wherein the step (a) of providing the Ziegler-Natta catalyst compnses:
a) suspending a particulate porous support in a inert medium,
b) contacting the slurry formed in step (a) with a solution of a hydrocarbon soluble organomagnesium compound in a hydrocarbon solvent, which solution either has been contacted before this step or is contacted concurrently with this step with an coordinating electron donor in a molar ratio of coordinating electron donor compound to organomagnesium compound of from 0.1:1 to 5:1, to form a solid product,
c) contacting the solid product of step b) with a halogenating agent,
d) resuspending the halogenated solid product of step c) in an inert solvent, adding a compound of titanium or vanadium, and optionally an alkanol and optionally an internal electron donor compound,
e) allowing the mixture formed in step d) to react, and recovering the solid product formed,
f) extracting the solid product of step e) with an excess of titanium tetrachloride, optionally dissolved in an inert solvent and recovering the solid catalytic component, and
g) contacting the solid catalytic component with either
   i) an aluminum compound or
   ii) an aluminum compound and an external electron donor compound, mixed together or in any order.

45. The process of claim 44 wherein the coordinating electron donor is selected from the group consisting of dialkyl ethers, diaryl ethers, cyclic ethers, furanes, tetrahydrofuran, tertiary alkylamines and siloxanes.

46. The process of claim 45 wherein the coordinating electron donor is selected from the group consisting of dimethyl ether, diethyl ether, di-n-propyl ether, di-isopropyl ether, di-n-butyl ether, di-isobutyl ether and tetrahydrofuran.

47. The process of claim 45 wherein the coordinating electron donor is diethyl ether.

48. The process of claim 41 wherein the alk-1-ene includes propylene.

49. The process of claim 41 wherein the catalyst further includes an external electron donor.

50. The process of claim 49 wherein the external electron donor is a compound having the formula $$R^1{}_n Si(OR^2)_{4-n} \tag{II}$$

wherein each $R^1$, which may be the same or different, represents a $C_1$–$C_{20}$ alkyl group, a 5- to 7-membered cyclic alkyl group optionally substituted with $C_1$–$C_{10}$ alkyl, a $C_6$–$C_{18}$ aryl group or a $C_6$–$C_{18}$ aryl-$C_1$–$C_{10}$ alkyl group, and $R^2$ may be the same or different and is a $C_1$–$C_{20}$ alkyl group, and n is the integer 1, 2 or 3.

51. The process of claim 50 wherein the external donor compound having formula II is selected from the group consisting of diisopropyldimethoxysilane, isobutylisopropyldimethoxysilane, diisobutyldimethoxysilane, dicyclopentyidimethoxysilane, cyclohexylmethyldimethoxysilane, dicyclohexyldimethoxysilane, isopropyl-tert.-butylidimethoxysilane, isopropyl-sec.-butylidimethoxysilane, and isobutyl-sec.-butylidimethoxysilane.

* * * * *